US011655425B2

(12) United States Patent
Kosonsittiwit et al.

(10) Patent No.: US 11,655,425 B2
(45) Date of Patent: May 23, 2023

(54) APPARATUS FOR FUEL GAS PRODUCTION AND COMBUSTION

(71) Applicant: Phakorn Kosonsittiwit, Sakaeo (TH)

(72) Inventors: Phakorn Kosonsittiwit, Sakaeo (TH); Sommas Keawluan, Songkhia (TH); Paisal Naksuk, Nonthaburi (TH); Thanakrit Kosonsittiwit, Saraburi (TH); Kittisak Imsanguan, Sakaeo (TH)

(73) Assignee: Phakorn Kosonsittiwit, Sakaeo (TH)

( * ) Notice: Subject to any disclaimer, the term of this patent is extended or adjusted under 35 U.S.C. 154(b) by 387 days.

(21) Appl. No.: 16/625,430

(22) PCT Filed: Oct. 5, 2018

(86) PCT No.: PCT/TH2018/000043
§ 371 (c)(1),
(2) Date: Dec. 20, 2019

(87) PCT Pub. No.: WO2019/078787
PCT Pub. Date: Apr. 25, 2019

(65) Prior Publication Data
US 2021/0171847 A1 Jun. 10, 2021

(30) Foreign Application Priority Data
Oct. 19, 2017 (TH) .............................. 1701006292

(51) Int. Cl.
*C10J 3/84* (2006.01)
*C10B 3/00* (2006.01)
(Continued)

(52) U.S. Cl.
CPC .................. *C10J 3/84* (2013.01); *C10B 3/00* (2013.01); *C10B 21/12* (2013.01); *C10B 27/06* (2013.01);
(Continued)

(58) Field of Classification Search
CPC ....... C10J 3/84; C10J 3/482; C10J 3/50; C10J 3/52; C10J 2200/158; C10J 2300/0916;
(Continued)

(56) References Cited

U.S. PATENT DOCUMENTS 4,359,326 A * 11/1982 Hoffert .................. B01J 8/0005
48/62 R
5,511,495 A 4/1996 Kinto et al.
(Continued)

FOREIGN PATENT DOCUMENTS

CN        102260537 A  * 11/2011
WO    WO-2009070941 A1 *  6/2009  .............. C10J 3/463

OTHER PUBLICATIONS

Machine Translation of WO2009070941 A1 (Feb. 7, 2021) (Year: 2021).*

(Continued)

*Primary Examiner* — Matthew J Merkling
(74) *Attorney, Agent, or Firm* — Harness, Dickey & Pierce, P.L.C.

(57) ABSTRACT

An apparatus for fuel gas production and combustion comprises a solid fuel feeding unit for receiving and feeding solid fuel; a gas producing unit being connected to the solid fuel feeding unit for receiving solid fuel from the solid fuel feeding unit; an air feeding unit connected to the gas producing unit for feeding air to the gas producing unit to cause a gasification reaction; an ash trapping unit connected to the gas producing unit for separating fly ash and dust from the fuel gas; a burner unit connected to the ash trapping unit for combusting the fuel gas; and an ash discharging unit connected to the gas producing unit and ash trapping unit and comprising a bottom ash discharging part and a fly ash discharging part, characterized in that the air feeding unit comprises a plurality of air feeding parts wherein at least one air feeding part being connected to the gas producing unit (Continued)

and at least one air feeding part being connected to the ash trapping unit.

18 Claims, 3 Drawing Sheets

(51) Int. Cl.
  *C10B 21/12*    (2006.01)
  *C10B 27/06*    (2006.01)
  *C10B 31/00*    (2006.01)
  *C10B 49/02*    (2006.01)
  *C10J 3/50*    (2006.01)
  *C10J 3/52*    (2006.01)
  *C10J 3/48*    (2006.01)
  *C10K 1/02*    (2006.01)

(52) U.S. Cl.
  CPC .............. *C10B 31/00* (2013.01); *C10B 49/02* (2013.01); *C10J 3/482* (2013.01); *C10J 3/50* (2013.01); *C10J 3/52* (2013.01); *C10K 1/026* (2013.01); *C10J 2200/156* (2013.01); *C10J 2200/158* (2013.01); *C10J 2300/092* (2013.01); *C10J 2300/093* (2013.01); *C10J 2300/0916* (2013.01); *C10J 2300/0956* (2013.01); *C10J 2300/1215* (2013.01); *C10J 2300/1223* (2013.01); *C10J 2300/1846* (2013.01)

(58) Field of Classification Search
  CPC ............ C10J 2300/092; C10J 2300/093; C10J 2300/0956; C10J 2300/1215; C10J 2300/1223; C10J 2300/1846; C10B 3/00; C10B 21/12; C10B 49/02; C10B 31/00
  See application file for complete search history.

(56) References Cited

U.S. PATENT DOCUMENTS

| | | | |
|---|---|---|---|
| 8,696,770 B2 | 4/2014 | Jeong | |
| 2002/0159929 A1 | 10/2002 | Kaneko et al. | |
| 2004/0055216 A1* | 3/2004 | Berger | F23G 5/0276 48/77 |
| 2005/0095183 A1 | 5/2005 | Rehmat et al. | |
| 2010/0040510 A1* | 2/2010 | Randhava | C01B 3/382 422/232 |
| 2010/0263487 A1* | 10/2010 | Orth | C21B 13/0066 201/31 |
| 2012/0017562 A1* | 1/2012 | Mazumdar | C10J 3/50 60/39.12 |
| 2012/0266485 A1 | 10/2012 | Abraham et al. | |
| 2013/0142723 A1* | 6/2013 | Dara | C10J 3/723 422/106 |
| 2014/0260300 A1* | 9/2014 | Chila | F23R 3/10 60/737 |
| 2017/0369801 A1* | 12/2017 | Glock | C10K 3/005 |

OTHER PUBLICATIONS

Machine Translation of CN 102260537 A (Oct. 6, 2022) (Year: 2022).*

* cited by examiner

APPARATUS FOR FUEL GAS PRODUCTION AND COMBUSTION

FIELD OF THE INVENTION

This invention is in a field of an engineering related to an apparatus for fuel gas production and combustion.

BACKGROUND OF THE INVENTION

The energy derived from fossil fuel, for example, natural gas, liquefied petroleum gas and petroleum oil are the main energy utilized in the industries. However, the fossil fuel price tends to increase and fluctuate. There is also an issue on the greenhouse gas emission from the combustion which affects the overall environment. Therefore, the inventions related to the energy from alternative solid fuels such as biomass, e.g. wood fractions, bagasse, rice hulls, cassava fiber, cassava root, palm shell, etc. have been promoted and developed to use them as fuel that provides energy.

The use of solid fuels such as biomass or coal as fuel, especially in the industries, is partially carried out by the gasification process, which is an energy conversion from solid fuel to gaseous fuel by heating at high temperature through a medium in the process such as air, a limited amount of oxygen or vapor. The gasification process changes the form of the internal chemical energy of carbon in biomass to combustible gas. The gas produced is of better quality and easier to use than directly burning solid fuel to produce heat.

Such gasification process is performed through an apparatus for fuel gas production which has various characteristics and functions as disclosed in the prior arts in the examples below.

Thai patent application no. 1501005543 discloses a biomass gasifier comprising of a gasifier which is a square chamber located at a backside of the gasifier. It contains the biomass and serves as a combustion chamber, biomass feeding port, combustion chamber and inclined plane. Such gasifier further comprises of at least one air guiding tube having at least one air inlet for guiding the air into the combustion chamber, which is installed on the outside at the backside of the gasifier. The positioning of the air guiding tubes, which are arranged separately such that they are inclined in parallel with the incline plane, makes it possible to control the amount of fuel gas fed through the biomass feeding channel located at the backside of the gasifier to flow down to the inclined plane continuously without hitting the fuel layers, as well as controlling the amount of air added to each part of the gasifier.

Thai patent application no. 1401003208 discloses a system for producing fuel gas from biomass comprising of a fuel feeder, gasifier reactor, fly ash remover and fuel gas dispensing system for transferring the fuel gas obtained from the said system for producing fuel gas to use in the thermal energy production such as a gas burner of a steel heating furnace.

Thai patent application no. 1401005693 discloses a furnace having an air-flow arrangement to enhance the combustion efficiency which consists of an air receiving chamber, which is an air flow channel allowing air to flow into the furnace, and a combustion chamber, which is connected to said air receiving chamber and has a wall with an opening and serves to contain the fuel. Said combustion chamber comprises of a plurality of fins mounted on the wall of the combustion chamber to direct the air flow to allow more air to flow into the furnace. Such invention aims to improve the biomass furnace structure to achieve a more efficient combustion, focusing on the effect of the fins provided at a gap between the inner furnace wall and the outer furnace wall.

PCT publication no. WO2011116689 (A1) discloses a process and system for producing synthetic gas from biomass fuel using pyrolysis comprising the following steps: 1) pre-treating the biomass fuel, 2) decomposing the biomass fuel with heat using the fast pyrolysis of biomass to obtain pyrolysis gas and carbon powder in a pyrolysis bed, 3) separating the pyrolysis gas from the carbon powder and solid thermal carrier using a cyclone separator, 4) separating the carbon powder from the solid thermal carrier using a solid-solid separator, 5) transferring the obtained pyrolysis gas to a condensation step, and 6) transferring a portion of the pyrolysis gas that cannot be condensed to a combustion bed.

It can be seen that such prior arts are not aimed at developing or improving the efficiency of an air feeding system to achieve a complete combustion, gas cleaning system and ash discharging system that are useful for the combustion, e.g. allowing for a combustion that gives a clean, higher-temperature flame and an ability to effectively control the flame intensity, and a development of such system so that it can be used with various types of solid fuel.

SUMMARY OF THE INVENTION

The present invention relates to an apparatus for fuel gas production and combustion from solid fuels such as biomass or coal which can be used in various applications such as heating a boiler, furnace, or in other heating processes by using the gasification principle to transform solid fuel to fuel gas, and a combustion of such fuel gas in order to obtain heat.

The apparatus for fuel gas production and combustion according to the present invention comprises:
  a solid fuel feeding unit for receiving and feeding solid fuel;
  a gas producing unit connected to the solid fuel feeding unit for receiving solid fuel from the solid fuel feeding unit;
  an air feeding unit connected to the gas producing unit for feeding air to the gas producing unit to cause a gasification reaction;
  an ash trapping unit connected to the gas producing unit for separating fly ash and dust from the fuel gas;
  a burner unit connected to the ash trapping unit for combusting the fuel gas; and
  an ash discharging unit connected to the gas producing unit and ash trapping unit, comprising a bottom ash discharging part and a fly ash discharging part, characterized in that the air feeding unit comprises a plurality of air feeding parts wherein at least one air feeding part being connected to the gas producing unit and at least one air feeding part being connected to the ash trapping unit.

According to the present invention, the solid fuel feeding unit comprises an air lock and a conveying pipe, the air lock mounted at an end of the conveying pipe while the other end of the conveying pipe is connected to the gas producing unit.

According to a preferred embodiment, the air lock has a rotary vane and a curved and sharp flow controlling plate provided inside the air lock. The flow controlling plate is mounted above the rotary vane. The conveying pipe has a conveyor provided inside. The conveyor may be a belt conveyor, chain conveyor, bucket elevator or screw conveyor, preferably screw conveyor.

According to the present invention, the gas producing unit is a chamber with a circular, elliptical or polygonal cross-section. It is divided into two parts: an upper gas producing part and a lower gas producing part. The upper gas producing part is connected to the ash trapping unit, the lower gas producing part has a cross-sectional area that is reduced from top to bottom, respectively, and a lower side of the lower gas producing part is connected to the bottom ash discharging part.

According to the present invention, the upper gas producing part is a chamber with a circular, elliptical or polygonal cross-section, preferably a polygon whose distances from all angles to the center are all the same and the lower gas producing part has a square pyramidal-like or conical-like shape.

The air feeding unit further comprises a blower and air collector.

According to a preferred embodiment, a plurality of air feeding parts comprises a first air feeding part connected to the lower gas producing part, a second air feeding part connected to the upper gas producing part, a third air feeding part connected to a wall of the ash trapping unit and a fourth air feeding part connected to the burner unit.

Preferably, the first air feeding part is a plurality of tubes mounted around the lower gas producing part, preferably in an upwardly-inclined manner. The second air feeding part is connected to the upper gas producing part above the end of the conveying pipe. The third air feeding part is arranged such that the air feeding direction is in the same direction with the gas flow that enters the ash trapping unit. The fourth air feeding part is provided as a group mounted in the same direction with the flame generation line, preferably at the backside of the burner unit or around the burner unit.

According to the present invention, the ash trapping unit is a vertical cylinder with a size of diameter being reduced from top to bottom, or a horizontal cylinder. The ash trapping unit is preferably operated by a centrifugal force.

According to the present invention, the bottom ash discharging part is a gutter unit comprised of at least a set of bidirectional rotation screws and water tanks provided at both ends of said gutter unit. The fly ash discharging part is a box with a valve for controlling the opening and closing, or a water tank.

According to the present invention, the gas producing unit and ash trapping unit have a pressure in a range of 30-300 mmH$_2$O and a temperature in a range of 700-1,000° C.

The object of the present invention is to provide an apparatus for fuel gas production and combustion that provides many advantages such as a complete combustion, an efficiency of cleaning the fuel gas and discharging the ash which are useful for the gasification reaction. Such apparatus can also be used with different solid fuels such as biomass or coal to obtain clean, high-temperature flame and to efficiently control the flame intensity.

DETAILED DESCRIPTION OF THE INVENTION

Figure 1:
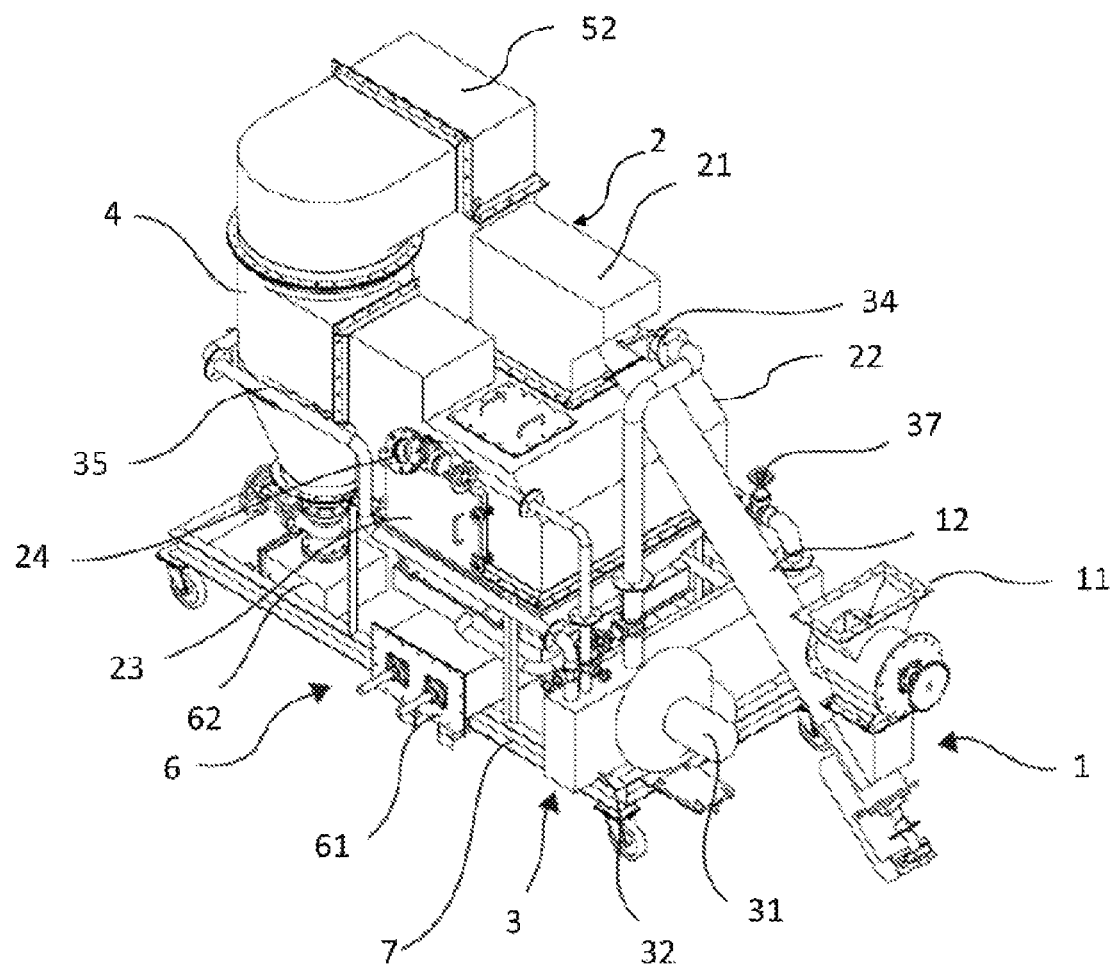
FIG. 1 is a perspective view of the apparatus for fuel gas production and combustion according to the present invention.
Figure 2:
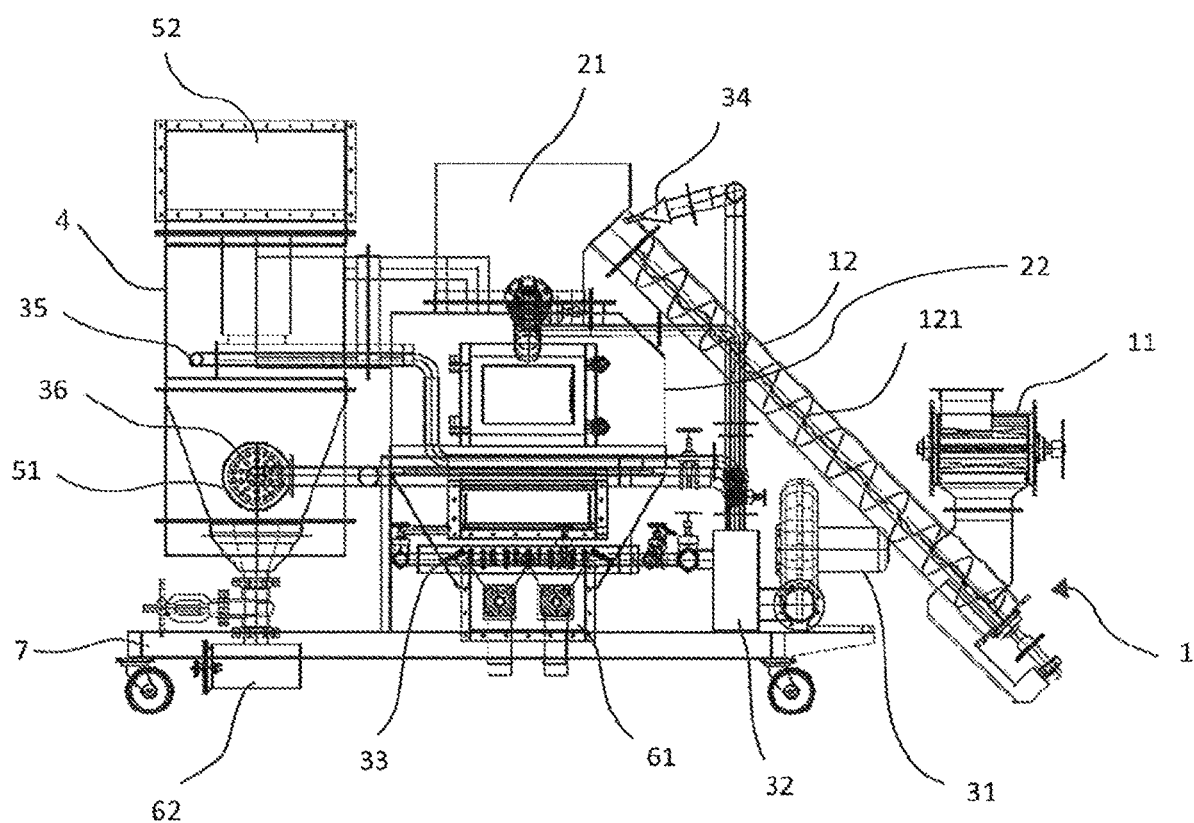
FIG. 2 is a cross-sectional view showing the internal structure of some components of the apparatus for fuel gas production and combustion according to the present invention.
Figure 3:
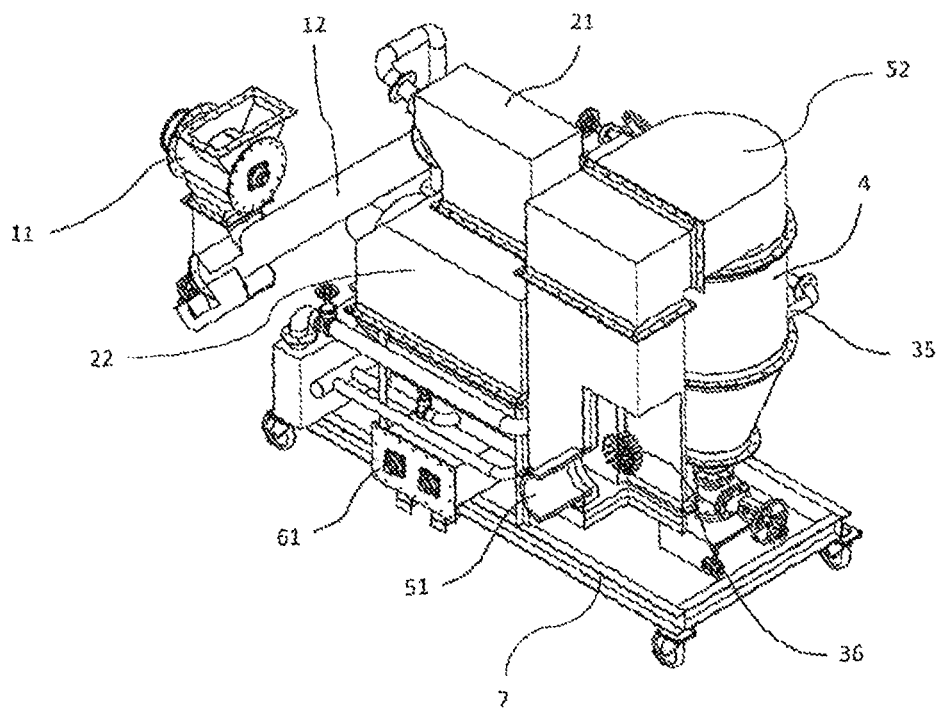
FIG. 3 is a perspective view of the other side of the apparatus for fuel gas production and combustion according to the present invention.

The apparatus for fuel gas production and combustion according to the present invention will now be described in more detail with reference to the accompanying drawings. However, it is not intended to limit the scope of the invention.

FIGS. 1 to 4 show the apparatus for fuel gas production and combustion according to an embodiment of the invention comprising the solid fuel feeding unit 1, the gas producing unit 2, the air feeding unit 3, the ash trapping unit 4, the burner unit 5 and the ash discharging unit 6, which comprises the bottom ash discharging part 61 and the fly ash discharging part 62 connected to each other and work correspondingly to achieve a complete combustion, an efficiency of cleaning the fuel gas and discharging the ash which are useful for the gasification reaction. Such apparatus can also be used with different solid fuels such as biomass or coal to obtain clean, high-temperature flame and to efficiently control the flame intensity.

The solid fuel feeding unit 1 receives and feeds the solid fuel such as biomass or coal to the gas producing unit 2, which is divided into two parts on the inside: the upper gas producing part 21 and the lower gas producing part 22 where the gasification takes place. This results in a fuel gas product, a group of volatile substances or tars, and/or carbon dust and ash. The carbon dust and/or bottom ash will drop to the bottom of the lower gas producing part 22, passing to the bottom ash discharging part 61 to equilibratory discharge the ash. In the meantime, the fuel gas, a group of volatile substances and tars, and/or carbon dust and fly ash will float to the top of the upper gas producing part 21 and enter the ash trapping unit 4. Inside the ash trapping unit 4, there is applied the centrifugal force to separate the carbon dust and fly ash from the fuel gas. The carbon dust and fly ash will be tossed down to the fly ash discharging part 62, while the fuel gas and volatile substances or tars which have been converted to gas will float to the top of the ash trapping unit 4 and will be combusted while flowing out through the burner unit 5, resulting in a clean, high-temperature flame. Moreover, the intensity of the flame can also be effectively controlled by controlling the amount of air and solid fuel.

Solid fuels such as biomass, according to the invention, can be selected from compressed biomass, biological wastes, saw dust, rice hulls, chopped woods, palm shell, a portion or a whole of agricultural crops such as sugar cane, corn, cassava, rice or any combination thereof. In addition, other types of solid fuel such as coal can also be used.

The solid fuel feeding unit 1 preferably comprises the air lock 11 and conveying pipe 12 having a conveyor 121 inside of the conveying pipe 12.

The air lock 11 receives and leads the solid fuel into the conveying pipe 12 effectively and without interruption due to feeding solid fuel of different shapes such as chopped woods. It also prevents a reverse flow of fuel gas caused by the gasification reaction in the gas producing unit 2 from flowing out.

The air lock 11 is preferably a rotary air lock comprising of an opening at the top for receiving solid fuel and connected to the body, which comprises internally of a rotary vane which rotates such that it can convey the solid fuel from the top to the conveying pipe 12 at the bottom of the air lock 11.

Moreover, the air lock 11 further comprises a curved and sharp flow controlling plate to direct the solid fuel flow downwards to the rotary vane and prevent the jamming of the solid fuel during feeding.

The solid fuel which is fed into the air lock 11 will enter the other end of the conveying pipe 12, which directs the solid fuel to the gas producing unit 2, the other end of the conveying pipe 12 being connected to the upper gas producing part 21.

The conveyance of the solid fuel from the conveying pipe 12 to the gas producing unit 2 may be an air conveyance and/or a conveyance using the conveyor 121. The conveyor 121 may be a belt conveyor, chain conveyor, bucket elevator, or screw conveyor. The conveyor 121 is preferably a screw conveyor that rotates to drive the solid fuel to move along the conveying pipe 12 into the gas producing unit 2.

The gas producing unit 2 is where the solid fuel reacts with air and heat and becomes a fuel gas. The gas producing unit 2 is a chamber with a circular, elliptical or polygonal cross-section, preferably a polygon whose distances from all angles to the center are all the same such as a square and equilateral triangle to equally receive air from all directions and allow for an effective gasification reaction. The gas producing unit 2 according to a preferred embodiment for the present invention is divided into two parts: the upper gas producing part 21 and the lower gas producing part 22.

One side of the upper gas producing part 21 is connected to an end of the conveying pipe 12 to receive the solid fuel, while the other side is connected to the ash trapping unit 4 and the bottom is connected to the lower gas producing part 22.

Further, the bottom of the lower gas producing part 22 is connected to the bottom ash discharging part 61 to discharge the incompletely-reacted carbon coal or dust or ash derived from the gasification reaction.

The lower gas producing part 22 has a cross-sectional area that is decreased from top to bottom, respectively. In an exemplary embodiment, it may look like a square pyramid (as shown in FIG. 4) or a cone.

Figure 4:
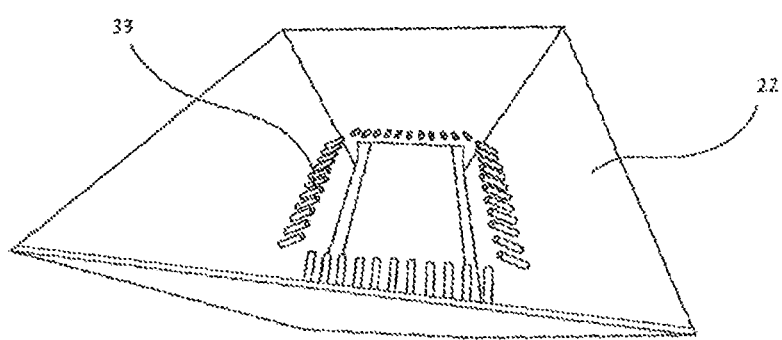
FIG. 4 is a perspective view showing the lower gas producing part and the arrangement of the first air feeding part according to the present invention.

As shown in FIG. 4, some part of the wall of the lower gas producing part 22 is connected to the first air feeding part 33 which is a plurality of tubes connected from the air collector 32. The first air feeding part 33 is preferably mounted around the lower gas producing part 22 such that it is inclined upwards. Such positioning will allow the air to efficiently flow into the lower gas producing part 22 as the air will thoroughly be dispersed, resulting in an effective gasification reaction.

The upper gas producing part 21 may be connected to the second air feeding part 34, which is a tube connected from the air collector 32 to allow the air to flow into the upper gas producing part 21 above the end of the conveying pipe 12 to prevent a reverse flow of fuel gas or volatile substances derived from the gasification reaction in the gas producing unit 2 from entering the conveying pipe 12 or flowing out, or to allow for a continuous, partial combustion reaction of the volatile substances or fuel gas or carbon dust that float to the top to achieve a complete gasification reaction. This results in a cleaner fuel gas. The fuel gas derived from the gasification reaction and partial combustion, and fly ash will float to the top of the upper gas producing part 21 and move to the ash trapping unit 4.

Optionally, the gas producing unit 2 may further comprises a door 23 for opening or closing and/or a cavity 24 on a wall of the gas producing unit 2. The cavity 24 is provided for looking inside of the gas producing unit 2. The cavity 24 is equipped with a fire-resistant glass to prevent a fire hazard inside the gas producing unit 2.

The air feeding unit 3 according to the present invention comprises the blower 31, air collector 32 and at least one air feeding part. In a particularly preferred manner so that the combustion is carried out effectively and consistently throughout the operating period of the apparatus for fuel gas production and combustion, the air feeding unit 3 should comprise at least four air feeding parts: the first air feeding part 33, the second air feeding part 34, the third air feeding part 35 and the fourth air feeding part 36.

The blower 31 accelerates the movement of air from one side to the other, resulting in an aggregation of the ambient air that are driven to the air collector 32 to gather the air from the blower 31. The air collector 32 receives air from the blower 31 and transfers it to the first, second, third and fourth air feeding parts 33, 34, 35, 36.

The first air feeding part 33 is connected to the lower gas producing part 22 to provide air to be used in the gasification reaction from all directions. According to a preferred embodiment, the first air feeding part 33 is a plurality of tubes mounted around the lower gas producing part 22 in an upwardly inclined manner.

The second air feeding part 34 is preferably connected to the upper gas producing part 21 above the end of the conveying pipe 12 to provide air to cause a partial combustion at the top and the gasification reaction of the volatile substances or carbon dust that float to the top. The second air feeding part 34 also drives the solid fuel into the upper gas producing part 21 and prevents the volatile substances or fuel gas from flowing back to the conveying pipe 12.

The third air feeding part 35 is connected to a wall of the ash trapping unit 4. It is preferably positioned such that the air feeding direction is in the same direction with the gas flow, which enters the ash trapping unit 4 to cause a partial combustion and the gasification of the volatiles and/or carbon dust. Therefore, the gas temperature is increased in the ash trapping unit 4. The fuel gas that enters the ash trapping unit 4 will be circulated to generate the centrifugal force to precipitate the fly ash or fine dust as a filtration. If a reaction occurs during the circulation, the heat will increase the circulation intensity, resulting in a better filtration. The third air feeding part 35 may be provided more than one, if necessary, to feed more air to the ash trapping unit 4 in case the size of the apparatus for fuel gas production and combustion is larger or there is a need to enhance the efficiency of the partial combustion or gasification reactions and trap the fly ash or fine dust.

The fourth air feeding part 36 is connected to the burner unit 5. The fourth air feeding part 36 is preferably provided as a group and mounted in the same direction with the flame generation line. It may be mounted at the backside of the burner unit 5 to provide air for a complete combustion at the burner unit 5, resulting in a high-temperature and highly-combustible flame.

The first, second, third and fourth air feeding parts 33, 34, 35, 36 are linked to each other in a network form through air tubes and the amount of air is controlled by at least one valve 37. The valve 37 controls the amount of air transferred from the air collector 32 to the air tubes, which distributes the air to different air feeding part. It may be controlled manually or automatically using a controller which is connected via a wire or wireless to the valve 37 to receive or send an execution instruction.

The ash trapping unit 4 is connected to the upper gas producing part 21 for bringing the fuel gas and other products obtained from the gasification reaction into the filtration process. The ash trapping unit 4 separates the contaminants from the fuel gas, preferably using the centrifugal force. According to the present invention, the ash trapping unit 4 may be a vertical cylinder with the diameter being reduced in a top-down manner or a horizontal cylinder. Also, the lower side of the ash trapping unit 4 is preferably connected to the fly ash discharging part 62 to discharge the fly ash or dust from the centrifugation of the ash trapping unit 4.

Moreover, a wall of the ash trapping unit 4 is connected to the third air feeding part 35, which is a hollow-end tube. The third air feeding part 35 should preferably be arranged in the same direction with the gas flow that enters the ash trapping unit 4 for supplying air to cause the partial combustion reaction. Upon moving into the ash trapping unit 4, the fuel gas product from the gas producing unit 2 will circulate in a cyclonic manner to separate the substances having different weights. The lightweight ash (fly ash) or dust will drop to the end region of the ash trapping unit 4 and the fuel gas will flow to the burner unit 5. The third air feeding part 35 provides enough air for the volatile substance and/or carbon dust to cause the partial combustion reaction or to allow the volatile substances and/or carbon dust to transform into gas more effectively. The heat from said reaction will enhance the circulation intensity, which contributes to an efficient centrifugation, especially the centrifugation of fine dust, and increased heat.

According to a preferred embodiment of the present invention, the burner unit 5 comprises a burner 51 which is a hollow tube or torch. The fuel gas obtained from the combustion process will be passed outside through the burner 51. The burner 51 is preferably connected to the fourth air feeding part 36, which is arranged in the same direction with the flame generation at the backside of the burner 51 for supplying air to be used in the fuel gas combustion to achieve a complete combustion and high-temperature flame. Moreover, there is only a slight contamination of dust, fume, ash or volatile substances, or none of the above.

The burner unit 5 may further comprises a gas conveyor 52 which is connected to the ash trapping unit 4 to convey gas to a position that is suitable for a combustion to obtain heat and convenient to transfer the obtained heat to external equipment such as a boiler or furnace which will continue to make use of such heat.

The ash discharging unit 6 discharges the dust or ash derived from the transformation of solid fuel to achieve an efficient gasification reaction. According to the present invention, the ash discharging unit 6 comprises the bottom ash discharging part 61 and fly ash discharging part 62.

The bottom ash discharging part 61 is connected to the base of the lower gas producing part 22. It is the gutter unit which is provided internally with bidirectional rotation screws and water tanks at both ends of such gutter unit. According to a preferred embodiment of the present invention, there should be at least two sets of the gutter unit to balance the ash discharge and make the ash from the combustion and the solid fuel which enters the gasification reaction in the gas producing unit 2 become flat uniformly and equilibratory to achieve an efficient gasification reaction in the gas producing unit 2.

The fly ash discharging part 62 is connected to the end of the ash trapping unit 4 to discharge the ash or dust derived from the centrifugation in the centrifugation process. According to a preferred aspect, the fly ash discharging part 62 may be a box equipped with a valve for controlling the opening and closing, or a water tank which traps ash in a wetly manner. The fly ash discharging part 62 may be larger in size or may be provided in a greater number to correspond to the size and function of the ash trapping unit 4.

The inside of the gas producing unit 2 and ash trapping unit 4 of the apparatus for fuel gas production and combustion according to the present invention preferably has a pressure in the range of 30-300 $mmH_2O$. The reaction temperature can be controlled by adjusting the amount of air to achieve a temperature in the range of 700-1,000° C. The pressure and temperature within such range are advantageous as they contribute to a more complete gasification reaction and allow the fuel gas to flow through the ash trapping unit 4 conveniently. They also increase the flow speed of the fuel gas in the ash trapping unit 4, resulting in a more efficient ash trapping in the fuel gas.

The apparatus for fuel gas production and combustion according to the present invention may preferably further comprises a sensor or control device to enable an automatic operation. The sensor is preferably selected from either a temperature sensor, pressure sensor or fuel level sensor, which is connected via a wire or wireless to the controller to receive and process a data. Moreover, such sensor or controller is connected via a wire or wireless to the valve 37, blower 31, solid fuel feeding unit 1 or ash discharging unit 6 to control the air, the amount of solid fuel or the ash discharge when the data received from the sensor or controller reaches the determined level. An instruction will be sent to the valve 37 to increase or reduce the amount of air supplied into the solid fuel feeding unit 1 to increase or reduce the transfer of solid fuel that enters the gas producing unit 2 to the ash discharging unit 6 to accelerate or decelerate the ash discharge, for example. Also, the sensor or controller may be connected to a display monitor to display an operation status for the user so as to adjust the data to suit the reaction.

Moreover, the apparatus for fuel gas production and combustion according to the present invention may further comprises a support structure 7 to support the apparatus for fuel gas production and combustion. The support structure 7 may be equipped with wheels and stands for the ease of installation and mobilization.

The apparatus for fuel gas production and combustion according to the present invention comprises different components with the characteristics described above and capable of working or functioning correspondingly. However, some modifications or changes may be made to the components of the apparatus for fuel gas production and combustion according to the present invention to obtain embodiments that are different than those described above but still provide the same effects. Such modifications or changes are still deemed to be within the concept and scope of the present invention, particularly of the appended claims.

The invention claimed is:

1. An apparatus for fuel gas production and combustion comprising:
   a solid fuel feeding unit for receiving and feeding solid fuel;
   a gas producing unit connected to the solid fuel feeding unit for receiving solid fuel from the solid fuel feeding unit;
   an air feeding unit connected to the gas producing unit for feeding air to the gas producing unit to cause a gasification reaction;

an ash trapping unit connected to the gas producing unit for separating fly ash and dust from a fuel gas;

a burner unit connected to the ash trapping unit for combusting the fuel gas; and an ash discharging unit connected to the gas producing unit and the ash trapping unit, the ash discharging unit comprising a bottom ash discharging part and a fly ash discharging part), wherein the air feeding unit comprises a plurality of air feeding parts, wherein at least one of the air feeding parts being connected to the gas producing unit and at least another one of the air feeding parts being connected to the ash trapping unit, and wherein the ash trapping unit is configured to receive air from the air feeding unit.

2. The apparatus for fuel gas production and combustion according to claim 1, wherein the solid fuel feeding unit comprises an air lock and a conveying pipe, the air lock being mounted at an end of conveying pipe while the other end of the conveying pipe is connected to the gas producing unit.

3. The apparatus for fuel gas production and combustion according to claim 2, wherein the conveying pipe has a conveyor provided inside the conveying pipe, the conveyor) is a belt conveyor, chain conveyor, bucket elevator or screw conveyor.

4. The apparatus for fuel gas production and combustion according to claim 1, wherein the gas producing unit is a chamber with a circular, elliptical or polygonal cross-section being divided into two parts: an upper gas producing part and a lower gas producing part, wherein the upper gas producing part being connected to the ash trapping unit and the lower gas producing part having a cross-sectional area that is reduced from top to bottom, respectively, and a lower side of the lower gas producing part being connected to the bottom ash discharging part.

5. The apparatus for fuel gas production and combustion according to claim 4, wherein the upper gas producing part is a chamber with a circular, elliptical or polygonal cross-section, and the lower gas producing part has a square pyramidal-like or conical-like shape.

6. The apparatus for fuel gas production and combustion according to claim 1, wherein the air feeding unit further comprises a blower and air collector.

7. The apparatus for fuel gas production and combustion according to claim 4, wherein the plurality of air feeding parts of the air feeding unit comprises a first air feeding part connected to the lower gas producing part, a second air feeding part connected to the upper gas producing part, a third air feeding part connected to a wall of the ash trapping unit and a fourth air feeding part connected to the burner unit.

8. The apparatus for fuel gas production and combustion according to claim 7, wherein the first air feeding part is a plurality of tubes mounted around the lower gas producing part.

9. The apparatus for fuel gas production and combustion according to claim 7, wherein the solid fuel feeding unit comprises a conveying pipe, and wherein the second air feeding part is connected to the upper gas producing part above an end of the conveying pipe.

10. The apparatus for fuel gas production and combustion according to claim 7, wherein the third air feeding part is arranged such that an air feeding direction is in a same direction with a gas flow that enters the ash trapping unit.

11. The apparatus for fuel gas production and combustion according to claim 7, wherein the fourth air feeding part is provided as a group mounted in a same direction with a flame generation line.

12. The apparatus for fuel gas production and combustion according to claim 1, wherein the ash trapping unit is a vertical cylinder with a size of diameter being reduced from top to bottom, or a horizontal cylinder.

13. The apparatus for fuel gas production and combustion according to claim 12, wherein the ash trapping unit is operated using a centrifugal force.

14. The apparatus for fuel gas production and combustion according to claim 1, wherein the fly ash discharging part is a box with a valve for controlling the opening and closing, or a water tank.

15. The apparatus for fuel gas production and combustion according to claim 1, wherein the gas producing unit and the ash trapping unit have a pressure in a range of 30-300 mm $H_2O$ and a temperature in a range of 700-1,000° C.

16. The apparatus for fuel gas production and combustion according to claim 11, wherein the fourth air feeding part is mounted in the same direction with the flame generation line at a backside of the burner unit or around the burner unit.

17. The apparatus for fuel gas production and combustion according to claim 8, wherein the plurality of tubes is mounted around the lower gas producing part in an upwardly-inclined manner.

18. The apparatus for fuel gas production and combustion according to claim 5, wherein the chamber of the upper gas producing has the polygonal cross-section, whose distances from all angles to a center are the same.

* * * * *